United States Patent
Hallitschke (12)

(10) Patent No.: US 11,702,004 B2
(45) Date of Patent: Jul. 18, 2023

(54) AMBIENT LIGHTING SYSTEM WITH PROJECTED IMAGE AND METHOD FOR CONTROLLING AN AMBIENT LIGHTING SYSTEM

(71) Applicant: AUTOSYSTEMS, a division of Magna Exteriors Inc., Aurora (CA)

(72) Inventor: Frank Hallitschke, Rivoli (IT)

(73) Assignee: AUTOSYSTEMS, A DIVISION OF MAGNA EXTERIORS INC., Aurora (CA)

( * ) Notice: Subject to any disclaimer, the term of this patent is extended or adjusted under 35 U.S.C. 154(b) by 0 days.

(21) Appl. No.: 17/875,119

(22) Filed: Jul. 27, 2022

(65) Prior Publication Data
US 2023/0038718 A1 Feb. 9, 2023

(30) Foreign Application Priority Data
Aug. 5, 2021 (IT) .......................... 102021000021302

(51) Int. Cl.
*B60Q 3/85* (2017.01)
*B60Q 3/14* (2017.01)
(Continued)

(52) U.S. Cl.
CPC ................ *B60Q 3/85* (2017.02); *B60Q 3/14* (2017.02); *B60Q 3/54* (2017.02); *B60Q 3/62* (2017.02);
(Continued)

(58) Field of Classification Search
CPC ... B60Q 3/14; B60Q 3/78; B60Q 3/62; B60Q 3/64; B60Q 3/66; F21V 23/0485
See application file for complete search history.

(56) References Cited

U.S. PATENT DOCUMENTS 8,049,722 B2 * 11/2011 Kumon ................ B60K 37/06
345/157
2006/0245200 A1 * 11/2006 Kuwana ................ B60Q 3/80
362/488
(Continued)

FOREIGN PATENT DOCUMENTS

DE 102013214162 A1 * 2/2015 ......... H03K 17/9622
IT 201800010732 A1 5/2020
WO 2020202002 A1 10/2020

OTHER PUBLICATIONS

Machine translation of Schmid et al., DE 102013214162 A1, published Feb. 19, 2015 (Year: 2015).*

*Primary Examiner* — William N Harris
(74) *Attorney, Agent, or Firm* — Dickinson Wright PLLC

(57) ABSTRACT

An ambient lighting system for automobiles configured to illuminate a passenger compartment, comprises: an optical system in turn comprising: a plurality of RGB LED light sources; a structural support on which the light sources are placed; and a contact surface on which a user can interact, and through which light rays can exit. The ambient lighting system also includes: a control unit configured to control the RGB LED light sources in order to present light animations; and a touch sensor configured to detect touch of the contact surface in a defined region, which is configured to define, along the optical system at least one soft key. The ambient lighting system further includes: a voice command recognition system electronically connected to the control unit and configured to recognize voice commands; and a projector configured to project an image, such as a symbol and/or logo, on the contact surface.

18 Claims, 4 Drawing Sheets

(51) Int. Cl.
  *B60Q 3/54* (2017.01)
  *B60Q 3/78* (2017.01)
  *B60Q 3/62* (2017.01)
  *F21V 23/00* (2015.01)
  *F21V 23/04* (2006.01)
  *F21Y 115/10* (2016.01)
  *G10L 15/00* (2013.01)

(52) U.S. Cl.
  CPC .............. *B60Q 3/78* (2017.02); *F21V 23/003* (2013.01); *F21V 23/0485* (2013.01); *B60K 2370/148* (2019.05); *B60K 2370/1434* (2019.05); *B60K 2370/1438* (2019.05); *B60K 2370/332* (2019.05); *B60K 2370/334* (2019.05); *B60K 2370/336* (2019.05); *B60K 2370/339* (2019.05); *B60K 2370/345* (2019.05); *F21Y 2115/10* (2016.08); *G10L 15/00* (2013.01)

(56) References Cited

U.S. PATENT DOCUMENTS

| | | | |
|---|---|---|---|
| 2007/0211483 A1* | 9/2007 | Ando | B60Q 3/82 |
| | | | 362/488 |
| 2016/0280039 A1* | 9/2016 | Vanhelle | H05B 45/20 |
| 2018/0212603 A1* | 7/2018 | Kwak | H03K 17/962 |
| 2019/0389308 A1* | 12/2019 | Wang | B60K 35/00 |
| 2022/0153188 A1* | 5/2022 | Hallitschke | B60Q 3/64 |

* cited by examiner

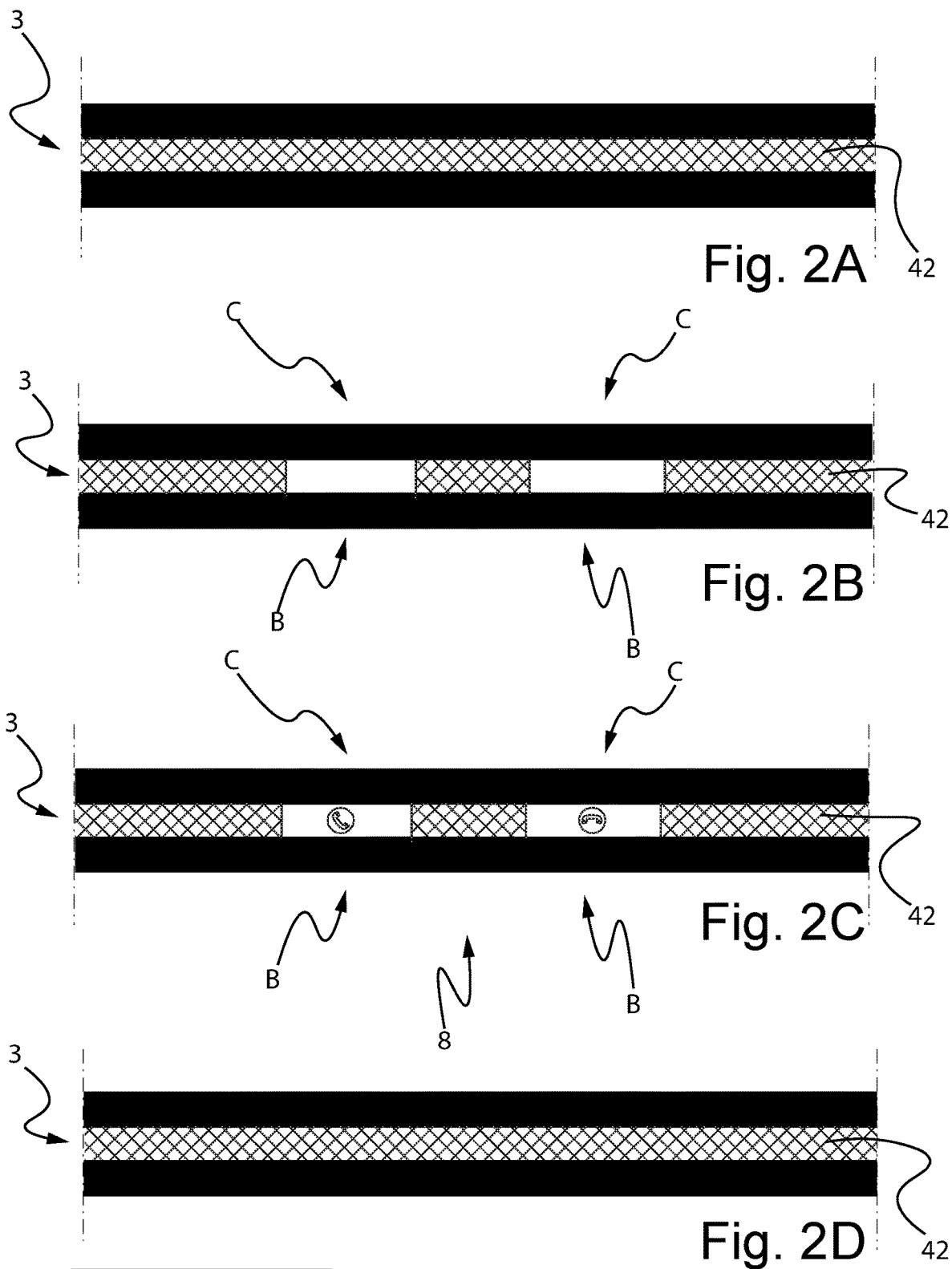

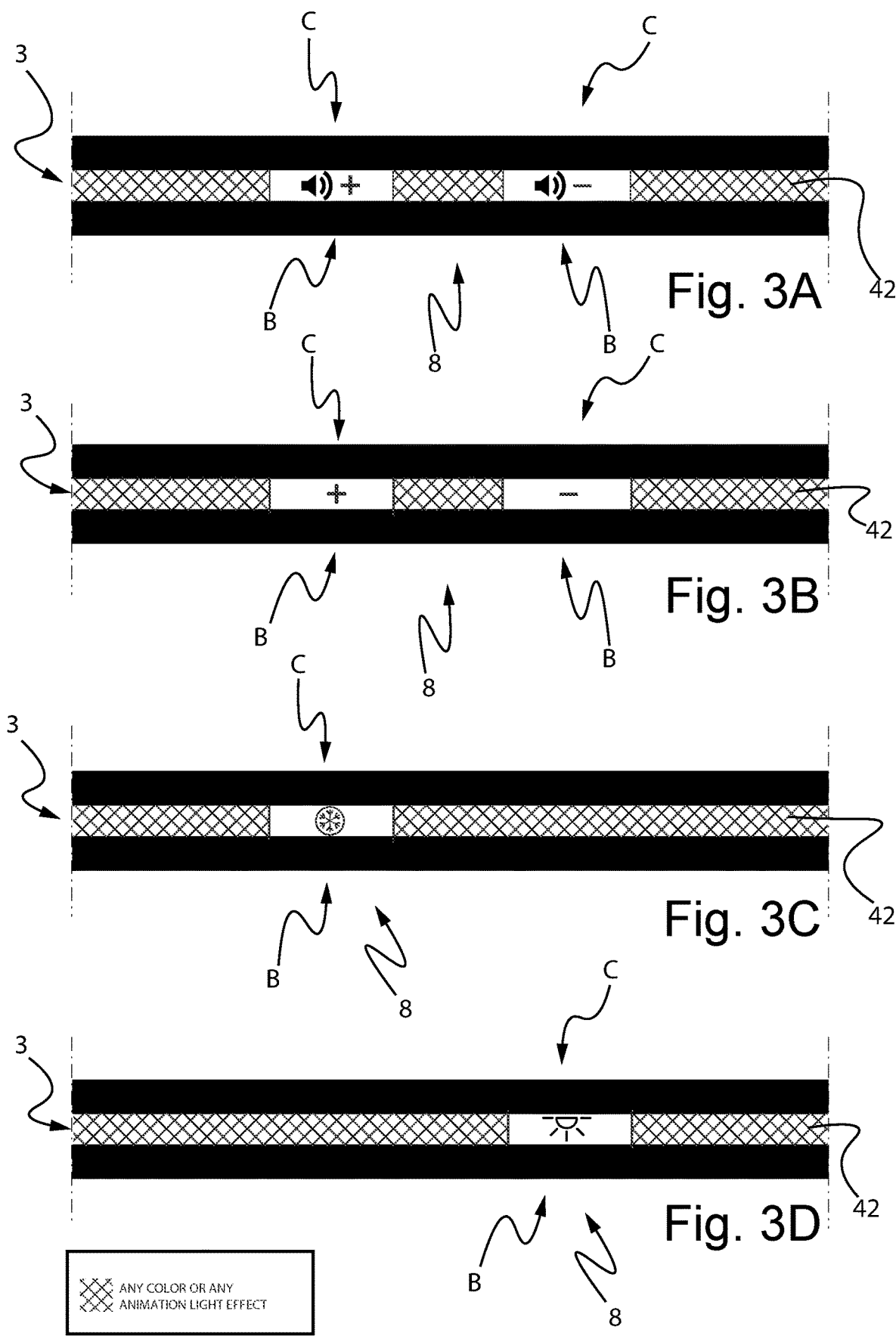

AMBIENT LIGHTING SYSTEM WITH PROJECTED IMAGE AND METHOD FOR CONTROLLING AN AMBIENT LIGHTING SYSTEM

CROSS REFERENCE TO RELATED APPLICATIONS

This U.S. utility patent application claims the benefit of Italian (IT) Patent Application No. 102021000021302, filed Aug. 5, 2021 the contents of which is incorporated herein by reference in its entirety.

FIELD

The present disclosure relates to an ambient lighting system for automobiles, in which the ambient lighting system is configured to realize a human-machine interface giving a specific visual feedback when users want control a functionality, for instance change the interior temperature, control air conditioning system, control free-hand systems etc. The present disclosure also relates to an automobile comprising the inventive ambient lighting system, according to the present disclosure.

BACKGROUND

Ambient lighting systems, comprising a plurality of RGB LED sources located along a band supporting structure, preferably covered by a diffuser module, in order to diffuse homogeneously the light rays emitted by the RGB LED sources, are known.

In the state of the art, the ambient lighting systems are configured to give a visual feedback to the user only. The ambient lighting systems can be programmed in order to show animation lighting effects. The lighting effects can be used in order to provide feedbacks to the driver in order to help the same driver during the driving of the automobile.

Are also known ambient lighting systems configured to receive inputs from the users, since they comprise touch sensors integrated in the ambient lighting system, able to determinate when the user is tapping on such ambient lighting system.

Conventional ambient lighting systems are only able to change color and/or intensity of the light emitted without giving a specific visual feedback concerning different human machine interface functions.

Hard buttons or hard keys having symbols and/or logos concerning related functionalities are known. Such symbols and/or logos cannot be changed on such hard buttons.

Screens and displays, comprised in interface systems, are known, which are able to show different symbols, icon and/or logos on the screen in order to show to the user the functionalities or applications which can be controlled through such screens or display. Such screens and displays are also applied in automobile's interior as a visual interface with the automobile's passengers. Such displays and screens have large dimensions and are explicitly designed in order to work as a human-machine interface and they are not designed to be an ambient lighting device or system. The shape and structure of the screens and displays are designed in order to shown different logos and symbols in function of the needs.

Some conventional ambient lighting systems may provide an active human-machine interface, which may receive different and various inputs from the user and provide different kinds of feedback in response to the inputs received.

Conventional ambient lighting systems generally do not provide specific indications though images, such as logos and/or symbols, of the functionalities which can be controlled by the same ambient lighting system. Furthermore, conventional ambient lighting systems do not provided for changing such images in response to the functionalities to be controlled though the ambient lighting system.

SUMMARY

The invention of the present disclosure aims at solving the above-mentioned technical problems and much more, since the present disclosure provides an ambient lighting system able to provide a specific visual feedback concerning the functionality for which has been activated, at that time, as a human-machine interface One aspect of the present disclosure relates to an ambient lighting system for automobiles and which is configured to illuminate at least a portion of a passenger compartment. The ambient lighting system comprises at least one optical system. The at least one optical system includes: a plurality of RGB LED light sources configured to emit light rays; a structural support on which the plurality of RGB LED light sources are located; and at least one contact surface on which a user can interact, and through which the light rays emitted by the plurality of RGB LED light sources can exit. The ambient lighting system also includes: a control unit configured to control the plurality of RGB LED light sources of the at least one optical system; at least one touch sensor in communication with the control unit and configured to detect a touch of the contact surface by a body portion of a user in at least one region defining at least one soft key; and at least one projector in communication with the control unit and configured to project an image on the at least one contact surface. The control unit is configured to activate the at least one soft key in response to a user command. The control unit is also configured to activate the at least one projector to cause an image concerning the user command to be projected on the contact surface at a location corresponding to the at least one soft key.

A further aspect of the present disclosure relates to a method for controlling an ambient lighting system in a passenger compartment of an automobile. The method includes: activating the ambient lighting system to present a programmed light animation; receiving a user command; activating at least one soft key, concerning the user command and corresponding to at least one region and projecting, using at least one projector, at least one image concerning the user command on a contact surface of the ambient lighting system and in an a location corresponding to at least one region where at least one soft key has been activated, while the ambient lighting system is presenting the programmed light animation; receiving signals from at least one soft key associated to the at least one region as a consequence of their interaction with the user; and deactivating the at least one soft key and interrupting projecting the image on the contact surface.

BRIEF DESCRIPTION OF THE DRAWINGS

Further details, features and advantages of designs of the invention result from the following description of embodiment examples in reference to the associated drawings, wherein:

FIG. 1A shows, in a section view, a portion of an embodiment of the ambient lighting system, according to the present disclosure, able to show logos and/or symbols on a contact surface of the ambient lighting system; FIG. 1B shows, from a top view, a portion of the ambient lighting system in which logos and/or symbols are projected on the contact surface in a first possible embodiment;

FIGS. 2A-2D show a sequence of pictures of the same portion of the ambient lighting system, according to a specific embodiment, changing during time, in which are shown schematically the sequence of steps from the activation step to the deactivation step of the ambient lighting system according to the present disclosure; in particular FIG. 2A shows, from a top view, a portion of the ambient lighting system that emits lights according to a color or animation desired; FIG. 2B shows, from a top view, the same portion of the ambient lighting system in which two blocks or regions are deactivated or changed while the rest of the ambient lighting system is continuing emitting light according to a color or an animation desired; FIG. 2C shows, from a top view, the same portion of the ambient lighting system in which inside the two deactivated or changed blocks or regions are projected two logos or symbols, namely a symbol of the telephone handset for picking up a call, on the right, and a symbol of the telephone handset for hanging up the call on the right, while the rest of the ambient lighting system is continuing emitting light according to a color or an animation desired; FIG. 2D shows, from a top view, a portion of the same ambient lighting system that emits lights according to a color or an animation desired, similar to FIG. 2A, and after the projector has stopped projecting the symbols on the contact surface of the ambient lighting system;

FIGS. 3A-3D show the same portions of the ambient lighting system, according to a specific embodiment, in which different logos and/or symbols are projected on the ambient lighting system, according to different functionalities for which the ambient lighting system becomes an human-machine interface, in particular; FIG. 3A shows symbols concerning the functionalities of controlling acoustic volume of the speakers of an audio system; FIG. 3B shows symbols concerning the functionalities of controlling a system such as interior temperature or air conditioning system; FIG. 3C shows a symbol concerning activating or deactivating the air conditioning system; FIG. 3D shows a symbol concerning activating or deactivating the ceiling lights;

DETAILED DESCRIPTION

Figure 1A:
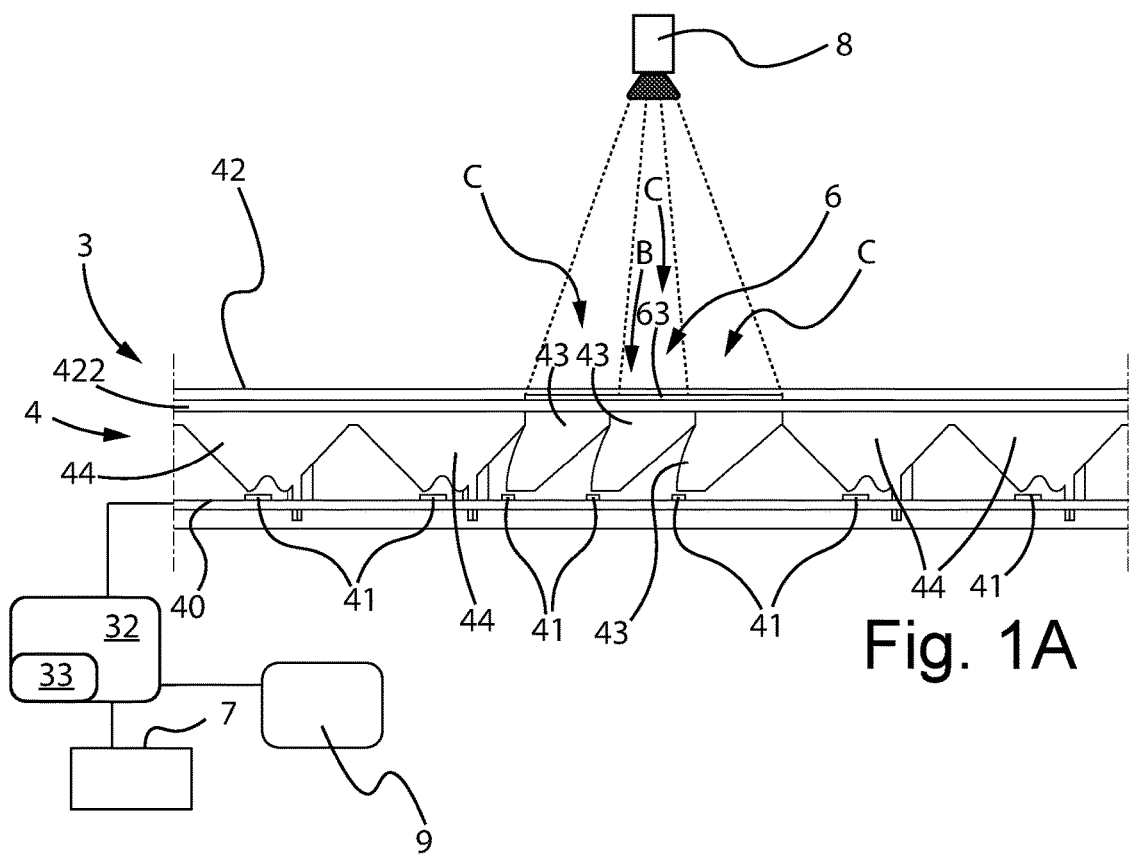
FIGS. 1A and 1B show different aspects of the ambient lighting system according to the present disclosure, in particular

Referring to the drawings, the present disclosure will be described in detail in view of following embodiments.

With reference to the above listened drawings, reference numeral 3 designates as a whole the ambient lighting system, according to the present disclosure. Furthermore, reference numeral 2 designates as a whole an automobile comprising a passenger compartment 22 in which the ambient lighting system 3 of the present disclosure is applied.

The ambient lighting system 3 of the present disclosure is especially configured to be applied on automobiles 2, the latter having passenger compartment 22.

The ambient lighting system 3 is configured to illuminate at least a portion of the passenger compartment 22.

More in general, the ambient lighting system 3 is configured to emit light in colors and/or intensities as desired, or run light animations, showing animation lighting effects etc. The ambient lighting system 3 has a longitudinal extension that is greater, at least of an order of magnitude, than the width and thickness of the ambient lighting system 3, and the width and thickness have comparable dimensions.

The ambient lighting system, according to the present disclosure, comprises at least one optical system 4.

In an embodiment, the ambient lighting system 3, and in particular the optical systems 4, has a tape structure configured to obtain the desired shape, for instance following shapes of one or more portions of the passenger compartment 22 of the automobile 2, for example a console.

The optical system 4 in turn comprises: a plurality of light sources 41 configured to emit light rays; and a structural support 40, on which the plurality of light sources 41 are located. Each light source of the plurality of light sources 41 may include a red-green-blue (RGB) light emitting diode (LED).

The optical system 4, furthermore, comprises at least one contact surface 42, on which a user can interact. Through the at least one contact surface 42 the light rays emitted by the plurality of light sources 41 can exit.

The ambient lighting system 3 comprises also a control unit 32. The control unit 32 is configured to control the plurality of light sources 41 of the optical system 4, for instance in order to present light animations.

The ambient lighting system 3 of the present disclosure and preferably the optical system 4, comprises at least one touch sensor 6. The least one touch sensor 6 is configured to detect touches of the contact surface 42 by a user's body portion in at least one region "C", which may also be called a block. In an embodiment, the touch sensor 6 is locally integrated in the ambient lighting system 3, more preferably the at least one touch sensor 6 is locally integrated inside the optical system 4. For the purpose of the present description, the term "integrated" means embedded, united and/or combined, thus a part of the device, which cannot be removed without disassembling or damage the ambient lighting system 3 as such.

The at least one touch sensor 6 is configured to detect the touching of the contact surface 42 by a user's body portion in the at least one region "C".

The at least one region "C" is configured to define, along the optical system 4, at least one soft key "B". For example, the edges of the region "C" may define edges of a soft key "B". The at least one touch sensor 6 is configured to provide the at least one soft key "B". For example, the at least one touch sensor 6 is able to detect touches on the contact surface 42 in an area defined by the edges of the region "C".

The at least one touch sensor 6 is in communication with the control unit 32 via an electronic interconnection.

The ambient lighting system 3 of the present disclosure further comprises a voice command recognition system 7. The voice command recognition system 7 is configured to recognize a voice command. For example, the voice command recognition system 7 may recognize one or more voice commands of at least one person that was previously recorded and identified. The voice command recognition system 7 is in communication with the control unit 32 via an electronic interconnection.

The ambient lighting system 3 of the present disclosure further comprises at least one projector 8. The at least one projector 8 is configured to project images, such as symbols and/or logos, on the contact surface 42.

The at least one projector 8 is in communication with the control unit 32 via an electronic interconnection.

The control unit 32 of the ambient lighting system 3 of the present disclosure is configured to activate the at least one soft key "B" in case of recognition of a command given by a person previously recorded and identified by the voice command recognition system 7.

Furthermore, the control unit 32 is configured to activate the at least one projector 8 to cause the image, such as the symbol and/or logo, to be projected on the contact surface 42. The image projected on the contact surface 42 by the at least one projector 8 may pertain to the voice command recognized by the voice command recognition system 7.

More in particular, the control unit 32 is able to activate the at least one projector 8 in such a way that a symbol and/or logo is projected on the contact surface 42 in correspondence of at least one region "C" where at least one soft key or soft button or programmable key "B" has been activated.

The ambient lighting system 3 of the present disclosure may project a symbol and/or a logo on at least one region "C" of the contact surface 42 concerning the functionalities activated by the voice command recognition system 7 and for which the at least one soft key "B" has been activated. Furthermore, the region "C" of the contact surface 42 on which a symbol and/or a logo is projected may correspond to the soft key "B" that is activated.

Therefore, on the same region "C" of the contact surface 42 can be projected different symbols and/or logos as a function of the functionalities activated by means of the voice command recognition system 7. Therefore, the ambient lighting system 3 of the present disclosure becomes an interactive human-machine interface able to provide a further visual feedback to the user, since a logo or symbol concerning the desired functionality is projected on the contact surface 42. The user, looking at the contact surface 42 of the ambient lighting system 3 after that a command has been recognized by the voice command recognition system 7, clearly sees the logo or symbol concerning the activated functionality, achieving a further visual feedback.

Thanks to the present disclosure the user is able to clearly identify the place where the soft key "B" is located and which is the functionality associated, in accordance with the command or instruction recognized by the voice command recognition system 7.

The ambient lighting system 3 is becoming a complex human-machine interface, which is able to provide a further visual feedback to users. This solution allows giving two different types of visual feedbacks. In fact, the same contact surface 42 gives a visual feedback emitting light rays, and, furthermore, a logo and/or symbol is projected on the contact surface 42, by means of the projector 8.

More in general, the contact surface 42, on which a logo or symbol is projected, is at least a portion of the illuminated surface of the ambient lighting system 3.

In an embodiment of the ambient lighting system 3, the contact surface 42 can be an optical filter, a diffusive module, a light guide module or other optical elements and/or a protection layer disposed upon another optical element and/or module of the optical system 4 and/or a combination of one or more optical elements and/or modules.

More in general, the contact surface 42 is designed to be touched by the user.

In an embodiment of the ambient lighting system 3 according to the present disclosure, the symbol and/or logo projected by the projector 8 on the at least one region "C" being characterized by variable color, shape and dimensions, as a function of one or more commands recognizable by the voice command recognition system 7, concerning one or more functionalities associated to the at least one soft key "B".

Therefore, the projector 8 is able to project different images, such as symbols and/or logos with different shapes, colors and/or dimensions, in accordance with the command recognized by the voice command recognition system 7.

The voice command recognition system 7 is able to recognize a plurality of instructions and/or commands, which are advantageously stored in a memory unit 33 comprised in the control unit 32.

The projector 8 is able to project a plurality of symbols and/or logos, which are advantageously stored in a memory unit 33 comprised in the control unit 32.

Preferably the control unit 32 is configured to create a memory matrix, thanks to the memory unit 33, in which for each instruction and/or command recognizable by the voice command recognition system 7 are linked one or more symbol and/or logo projectable by the projector 8, on the contact surface in one or more regions or blocks "C".

In a possible embodiment of the ambient lighting system 3 of the present disclosure the contact surface 42 has extension greater than the extension of the rest of the optical system 4, thus also overlapping a non-optical portion of the ambient lighting system 3.

In a possible embodiment, the optical system 4 further comprises at least one diffusive module 422. The at least one diffusive module 422 is configured to diffuse homogeneously the light rays emitted by the plurality of light sources 41. The diffusive module 422 can be located below the contact surface 42 or being part of the same contact surface 42, thus being embedded or becoming the contact surface 42.

In a possible embodiment, the optical system 4 further comprises a plurality of light guide modules (43, 44). The light guide modules (43, 44) are interposed between the light sources 41 and the at least one contact surface 42. The light guide modules (43, 44) are aligned with each other along the longitudinal extension of the optical system 4 of the ambient lighting system 3. The light guide modules (43, 44) are configured to guide the light rays emitted by the light sources 41, and in particular towards the contact surface 42 or the diffusive module 422.

In one embodiment, illustrative and not limitative, at least one subgroup of the light guide modules 43 is configured to isolate the light rays emitted by each light guide module (43, 44) in order to provide the at least one regions "C" configured to be activated, lighting up, or deactivated, not lighting up, with very sharp contrast with adjacent light guide modules (43, 44) of the optical system 4 of the ambient lighting system 3. This embodiment could be used for better defining each region "C" of the contact surface 42 where the at least one touch sensor 6 is able to detect the touch of the contact surface 42 by a user, touch sensor 6 that provides the at least one soft key "B". More in particular, inside the region "C" of the contact surface 42, inside its borders, is where at least one logo and/or symbol is projected by the projector 8.

More in general, the projector 8 is configured to project symbols and/or logos on the at least one contact surface 42.

In one possible embodiment the projector 8 is designed in such a way to project symbols and/or logos on the contact surface 42 even when the contact surface 42 is activated, thus lit up. Therefore, the projector 8 is configured to project an image, such as a logo and/or symbol, which is visible over the contact surface 42 even when the contact surface 42 is lit up, thus emitting light in one or more colors or running a light animation, showing animation lighting effects. It is clear that color(s), intensity, contrast and/or shape(s) of the symbol and/or logo projected by the projector 8 are in such a way to be clearly seen by the user although the contact surface 42 is lit up or illuminated.

In another possible embodiment, the projector 8 is designed in such a way to project symbols and/or logos on the contact surface 42 when the contact surface 42 is deactivated thus not lit up, more in particular the contact surface 42 is deactivated thus not lit up in correspondence to the regions or blocks "C". Therefore, the projector 8 is configured to project a logo and/or symbol in a not lit up zone or region "C". In this embodiment, the zone or region "C" of the contact surface 42, inside of which the projector 8 projects one or more logos or symbols, is not emitting light, increasing the contrast effect and rendering the symbols and/or logos clearer and more visible over the contact surface 42.

In an embodiment of the ambient lighting system 3 of the present disclosure the control unit 32 is configured to deactivate the at least one light source 41 associated with at least one the at least one region "C", deactivating the region "C", from which no light will come out, in case the at least one soft key "B" has been activated, in particular activated in the region "C"; region "C" inside of which the projector 8 projects a logo and/or symbol.

The control unit 32 is configured to activate the at least one projector 8 in such a way that a symbol and/or logo, concerning the command recognized by the voice command recognition system 7, is projected on the contact surface 42 in correspondence of the region "C" deactivated, where at least one soft key or soft button or programmable key "B" has been activated.

The present embodiment allows identifying clearly the region "C", since they are deactivated, thus not lit up, over the rest of the ambient lighting system 3 and at the same time, projecting on the region "C" a logo or symbol concerning the functionalities to which the soft key "B" is associated, related to the command recognized by the voice command recognition system 7. This embodiment allows the skilled person to immediately recognize the location of the at least one soft key "B" and functionalities associated to the same soft key "B", since two different visual feedbacks are given to the user.

In a possible embodiment of the ambient lighting system 3 of the present disclosure the at least one projector 8 is located inside the passenger compartment 22 of the automobile 2, in a remote place with respect to the optical system 4. In this embodiment, the projector 8 is located in a place above the contact surface 42, and in particular above the region "C" where a soft key "B" can be activated.

In another possible embodiment of the ambient lighting system 3 of the present disclosure the at least one projector 8 is at least in part integrated in the optical system 4, for instance along at least one longitudinal edge of the contact surface 42.

In one illustrative embodiment of the ambient lighting system 3 according to the present disclosure, the contact surface 42 is located above the light guide modules (43, 44). Preferably, the contact surface 42 is a transparent film or layer that allows achieving anti-reflective and/or anti-smudging purposes. The contact surface 42 can be made of plastic or glass, or any other suitable material. In the same embodiment, each guide module (43, 44) is interposed between the light sources 41 and the contact surface 42.

More in general, in the ambient lighting system 3 of the present disclosure the at least one touch sensor 6 is configured to provide at least one soft key "B". For the purpose of the present description, the term "soft key" may be defined as a simulated button or key that is displayed on a surface configured to be touched. Such a soft key may also be called a "virtual button", "soft button", "programmable key" or "virtual key". Thanks to a soft key, electronic circuits, which could be located remotely, can be controlled, activating or deactivating one or more functionalities. In this embodiment, the least one touch sensor 6 allows the ambient lighting system 3 to become an active human-machine interface which is able to receive inputs from the users.

More in general, the touch sensor 6 is able to detect when a surface, such as the contact surface 42, has been touched by a user. For example, the touch sensor 6 may detect a contact on the contact surface 42 by one or more fingers of a user.

The at least one touch sensor 6 may include a capacitive touch sensor that is locally integrated in the ambient lighting system 3. Alternatively, or additionally, the at least one touch sensor 6 may include an optical touch sensor.

The touch sensor 6 may include an optical touch sensor that is integrated in the projector 8. For example, a touch sensor 6 using an optical touch sensor may be integrated in the projector 8 which is located remotely from the optical system 4. Alternatively, the touch sensor 6 may be located in the optical system 4. For instance, the touch sensor 6 may be configured as an optical touch sensor that is located along at least one longitudinal edge of the contact surface 42. The touch sensor 6 may comprise one or more infrared image sensors.

In some embodiments, the contact surface 42 can be considered as part of the touch sensor 6.

In an embodiment of the ambient lighting system 3 of the present disclosure only one touch sensor is used for detecting touches on the contact surface 42 for each region "C".

In another embodiment, a plurality of touch sensors 6 are associated with each region "C". The plurality of touch sensors 6 may detect touches on the contact surface 42 in the corresponding region "C". In this embodiment, more than one touch sensor 6 may be used for detecting the touches of the contact surface 42 by a user for each defined region "C". The plurality of touch sensors 6 are electronically connected to the control unit 32.

More in general, the control unit 32 is able to process the signals received by the one or more touch sensors 6. For instance, the control unit 32 is configured to detect a sliding of the user's body portion on the contact surface 42 along at least one direction. More preferably, for instance in the embodiment in which a plurality of touch sensors 6 are comprised, the control unit 32 is configured to detect the way, along a direction, along which the user's body portion is sliding on the contact surface 42. For instance, the control unit 32 is able to detect if the user's body portion is sliding on the contact surface and if the user's body portion is sliding from the right to the left on the contact surface 42 or the contrary from the left to the right, thanks to a plurality of touch sensors 6.

In the ambient lighting system 3 of the present disclosure for instance thanks to the optical system 4, a part of the ambient lighting system 3, and in particular the region "C"

can be illuminated differently with respect to the rest of the ambient lighting system 3 and/or being deactivated, thus not lighting up. In this embodiment, the region "C" can be seen immediately, and without doubts, by the users, who know intuitively where they have to touch on the ambient lighting system 3 in order to give inputs concerning the functionality of which the projector 8 is projecting the corresponding symbol or logo.

Thus, the ambient lighting system 3 of the present disclosure is turned into a functional part and it can interact actively with the users.

With reference to the embodiment of the ambient lighting system 3 in which the touch sensor 6 is a capacitive touch sensor, the touch sensor 6 is located below the contact surface 42.

In a possible embodiment, illustrative and not limitative, of the ambient lighting system 3 of the present disclosure the touch sensor 6 comprises at least one conductive layer 63, which is located below the contact surface 42. In one embodiment, the touch sensor 6, more preferably the conductive layer 63, is located on a face of the structural support 40. For instance, the touch sensor 6 can be located on the structural support 40, for instance between the light sources 41 along the extension of the ambient lighting system 3. Alternatively, the touch sensor 6, and in particular the conductive layer 63, can be located on a face of the structural support 40 that is opposite to the face where the light sources 41 are located. In a different embodiment, the touch sensor 6 is integrated inside the structural support 40, so that they are combined in a single body.

In the embodiment of the ambient lighting system 3 in which the optical system 4 comprises a light guide module (43, 44), the conductive layer 63 may be located above at least one light guide module (43, 44). In this embodiment, the at least one conductive layer 63 is made of conductive transparent material.

Possible embodiments of an ambient lighting system comprising capacitive touch sensors are described in more detail in the patent application WO2020202002A1, the whole content of which has to be considered as incorporated by reference in the content of the present patent application.

More in general, in a possible embodiment, the at least one conductive layer 63 is interposed between the at least one light guide module (43, 44) and the at least one diffusive module 422 may be located on the light guide module (43, 44). Alternatively, the conductive layer 63 may be fixed to a face of the diffusive module 422, which faces toward the light guide module (43, 44) or faces toward contact surface 42.

In another possible embodiment, the at least one conductive layer 63 is placed above the at least one diffusive module 422, or fixed to a face of the contact surface 42, opposite of the face on which the user can touch the contact surface 42.

In all the above-mentioned embodiments, the conductive layer 63 is made of conductive transparent material. The capacitive touch sensor 6 may include design details that may depend on its position respect to the contact surface 42.

The entire ambient lighting system 3, and in particular the optical system 4, may be configured to match design details of the touch sensor 6. In view of the above, it is clear that the position of the touch sensor 6, and its elements, can be chosen according to the needs, maintaining all its operational functionalities.

In one possible embodiment, only a portion of the touch sensor 6 may be located inside the optical system 4 of the ambient lighting system 3. For example, a conductive layer 63, which acts as a sensing electrode of a capacitor, can be locally placed in the optical system 4, and electronic components, which are configured to evaluate whether the user touches the contact surface 42, can be located remotely. For instance, the electronic components of the touch sensor 6 may be located in the same control unit 32 of the ambient lighting system 3.

More in general, the control unit 32 is able to detect changes in capacitance respect to one or more electrodes of one or more capacitive touch sensors 6.

Generally speaking, the touch sensors 6 are able to detect touches on a surface that is defined, from shapes and dimensions point of view, by the region "C", which is illuminated by the optical system 4 or deactivated, according to the present disclosure. On the other hand, the touch sensors 6 may be configured so that in case of touches made outside the borders of the region "C", no touch is detected; thus no change in capacitance is detected in the capacitive touch sensor, or no interaction with rays, for instance infrared rays, is detected in the optical touch sensor.

In the embodiment of the ambient lighting system 3, in which the optical system 4 comprises a plurality of light guide modules (43, 44), each light guide module (43, 44) is configured to be associated to a single light source 41. Alternatively, each of the plurality of light guide modules (43, 44) is configured to be associated to two or more light sources 41.

Going further down to details for realizing the ambient lighting system 3 of the present disclosure the contact surface 42 can be provided in a single piece that extends along the length of the ambient lighting system 3. In an alternative embodiment, the contact surface 42 may include two or more portions, which may be joined together in order to appear as a single piece; thus, the junctions are not visible by the users. The contact surface 42 can be made of Plexiglas, for instance OV200, or other suitable materials. In the same way, a diffusive module 422 can be provided as a single piece that extends along the length of the ambient lighting system 3. Alternatively, the diffusive module 422 may include two or more portions, which may be joined together.

The structural support 40 can be provided as a single piece, which extends along the length of the ambient lighting system 3. Alternatively, the structural support 40 may include two or more portions. The structural support 40 can be a PCB, thus having well known structural features. In a possible embodiment, the structural support 40 is made of composite material, composed of woven fiberglass cloth with an epoxy resin, for instance FR-4 material. In an alternative embodiment, the structural support 40 is made of elastic material, allowing it to be bent, in order to follow a specific non-rectilinear path along the passenger compartment 22, for instance a console.

The plurality of light sources 41 are LED of RGB kind. More preferably, the RGB light sources 41 are of front emission kind.

In a possible embodiment, illustrative and not limitative, of the ambient lighting system 3 of the present disclosure in which light guide modules (43, 44) are comprised, first light guide modules 43 and second light guide modules 44 are comprised. More preferably, the at least one subgroup of the light guide modules (43, 44) are first light guide module 43.

Preferably, the first light guide modules 43 are grouped and are configured to be interposed between the second light guide modules 44, along the ambient lighting system 3. FIG. 1A shown an embodiment in which three first light guide modules 43 are grouped and configured to be interposed between second light guide modules 44, along the ambient lighting system 3.

More in general, the second light guide module 44 is configured to emit light rays homogeneously along the ambient lighting system 3. The second light guide module 44 cooperate with a diffusive module 422 in order to emit light homogeneously along the ambient lighting system 3, reducing the number of light sources 41 and avoiding to see hot points along the ambient lighting system 3, in particular in correspondence to the light sources 41.

The first light guide modules 43 are configured to define the one or more regions "C".

Possible embodiments of the first light guide module 43 are disclosed in the Italian patent application IT201800010732A1, the whole content of which has to be considered as incorporated by reference in the content of the present patent application.

Figure 4:
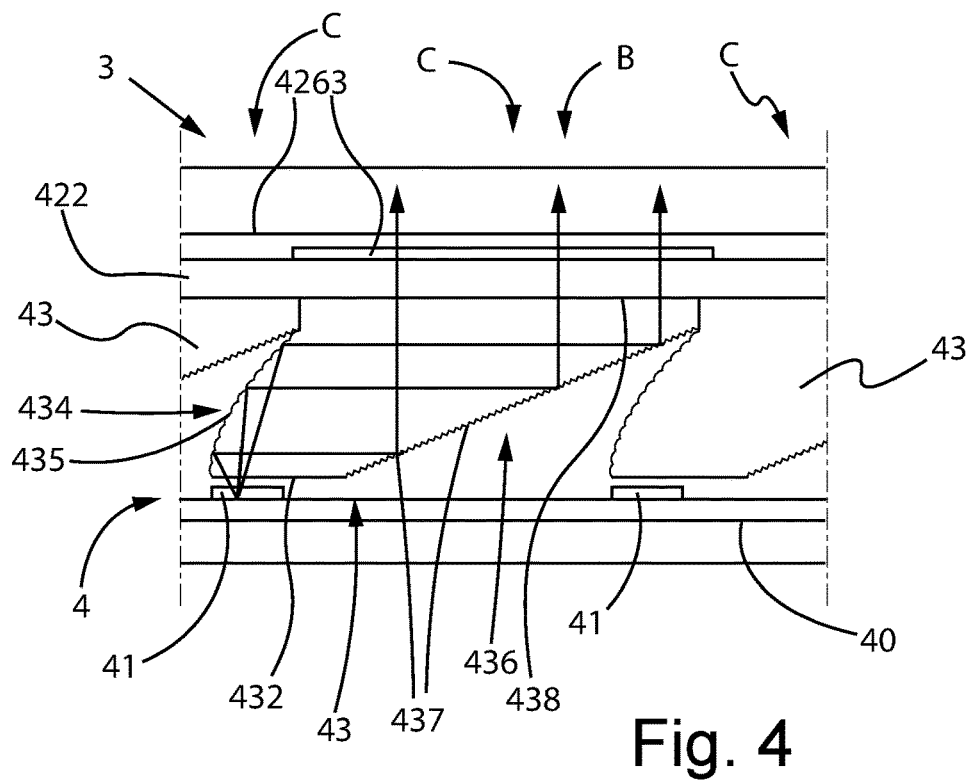
FIG. 4 shows an embodiment of a light guide module suitable for defining the blocks or regions inside of which a logo and/or symbol can be projected by a projector.

Hereafter an embodiment of the first light guide module 43 is described. Each first light guide module 43 comprises a planer inlet surface 432, from which the light rays emitted by the light source 41 enter; a parabolic reflecting surface 434 configured to collimate, in a controlled manner, the light rays emitted by the light source 41 and entering from the inlet surface 432. Advantageously, the light source 41 is positioned in the focus of the parabolic reflecting surface 434. Each first light guide module 43 further comprises an extractor assembly 436 comprising a plurality of extracting prisms 437. The extractor assembly 436 is configured to deflect the light rays reflected by the parabolic reflecting surface 434. Each first light guide module 43 further comprises an emission surface 438, from which the light rays deflected by the extractor assembly 436 come out. Each first light guide module 43 is designed in such a way that the light rays coming out of the emission surface 438 are substantially perpendicular to the emission surface 438. In an embodiment of the first light guide module 43, the parabolic reflecting surface comprises a plurality of pipe optics 435, which are distributed along the parabolic curve of the reflecting surface 434 and are configured to widen, in a controlled manner, the beam of light rays collimated by the parabolic reflecting surface 434. Preferably, the parabolic reflecting surface 434 and/or the extractor assembly 436 comprise metalized surfaces in order to increase the light ray reflection or deflection action. Even more preferably, the plurality of extracting prisms 437 comprises an alternation of inclined surfaces, relative to the parabolic reflecting surface 434, and parallel surfaces, relative to the axis of the parabolic reflecting surface 434. FIG. 4 shows an embodiment of the first light guide module 43 configured to define the blocks or regions "C" inside of which a logo and/or symbol can be projected by projector 8. With reference to FIG. 4, above the emission surface 438 a diffusive module 422 is placed, preferably the diffusive module 422 is on the emission surface of the first light guide module 43. In the embodiment shown in FIG. 4, above the diffusive module 422 is placed the contact surface 42. Between the diffusive module 422 and the contact surface 42 is locally interposed a conductive layer 63 of a capacitive touch sensor, which allows defining the soft key "B".

More in general, the shape, thickness, and length of the light guide modules (43, 44) can change depending on the particular requirements of the ambient lighting system 3 of the present disclosure. Other possible embodiments of the first light guide module 43, not described in detail in the present application, may be configured to prevent light rays guided by two different light guide modules (43, 44) to mix with one another, and should be considered within in the scope of the present disclosure.

More in general, the light guide modules (43, 44) may each include an optical element that conducts light rays inside its structure, guiding the light rays, thanks to total reflection effect of the light rays. The light guide modules (43, 44) can be made of transparent plastic materials, for instance PMMA, or of transparent silicon materials. The plurality of light guide modules (43, 44) can be manufactured as a single piece. Alternatively, they can be manufactured as a plurality of elements, which have to be assembled, and joined, in the ambient lighting system 3, according to the present disclosure.

More in general, the control unit 32 is configured to drive all the light sources 41 in function of a computer program or software comprising a sequence of steps that allow driving the plurality of light sources 41. The computer program or software can be stored in a memory unit 33.

In an embodiment of the ambient lighting system 3 of the present disclosure, the touch sensors 6 are activated after a specific command of the users, command that is received by the voice command recognition system 7 and properly managed by the control unit 32, which activates the touch sensors 6. In an embodiment, the touch sensors 6 are activated by the control unit 32 when, preferably only when, the same control unit 32 receives a command of activation of a specific function concerning the ambient lighting system 3 though the voice command recognition system 7.

The touch sensors 6 may be activated when, or shortly after the corresponding light sources 41 are driven in order to let the user see or recognize the region "C" on which the user can interact, activating them, with a desired color and/or intensity, or deactivating them. Thus, preferably, the touch sensors 6 are query (activated) only when the light sources 41 are properly driven for letting the user see region "C" and/or the logo or symbol projected by the projector 8.

More in general, at the same time in which the touch sensors 6 are activated, the projector 8 is driven by the control unit 32 in such a way that one or more logos or symbols, concerning the specific function recognized by the voice command recognition system 7, are projected on the contact surface 42 into one or more region "C".

In an embodiment of the ambient lighting system 3 according to the present disclosure, in a normal using condition, the lighting system 3 emits light in a desired color and intensity, according to the user's behaviors and desires, or the ambient lighting system 3 can run a light animation, for example a welcome animation etc. In an advanced using condition, the ambient lighting system 3 could be brought in an interactive configuration. In the interactive configuration, when a voice and command is properly recognized by the voice command recognition system 7, the region "C", preferably with sharp edges, is made visible, in particular switching off the corresponding light source 41. At the same time the touch sensors 6 are activated and the projector 8 is driven to project symbols and/or logos on the contact surface 42.

In an alternative embodiment, in the interactive configuration, when a voice and command is properly recognized by the voice command recognition system 7 the touch sensors 6 are activated and the projector 8 is driven to project symbols and/or logos on the at least one contact surface 42 in correspondence of the region "C". In this embodiment, the edges of the region "C" are not visible, thus the projector 8 projects a symbol or logo on an illuminated contact surface 42.

More in general, the ambient lighting system 3 of the present disclosure is designed so that it concerns one or more functionalities, in which the functionalities are one or more of: passenger compartment temperature regulation system; air conditioning system; telephone audio system; audio music reproduction system; seat adjustment system; passenger compartment lighting system; etc.

In the ambient lighting system 3 of the present disclosure, for each functionality which can be controlled by the ambient lighting system 3, the projector 8 may be designed to project a specific image, such as a symbol or logo of the corresponding functionality.

FIGS. 3A-3D show portions of the ambient lighting system 3, according to a specific embodiment, in which different logos and/or symbols are projected on the ambient lighting system according to different functionalities for which the ambient lighting system becomes an human-machine interface, in particular, the projector 8 projects one or more specific logos or symbols on the contact surface 42 in one or more region "C".

For instance, FIG. 3A shows symbols and logos concerning the functionalities of controlling acoustic volume of the speakers of an audio system. In this embodiment, the projector 8 projects a first logo of a speaker with a "+" symbol, on the left, and a second logo of a speaker with a "−" symbol, on the right. In this figure, two regions "C" are clearly shown in which the contact surface 42 does not emit light among the remainder portions of the contact surface 42, from which light is emitted. The light emitted could be of any color or any animation light effect. In this embodiment, a user touching on the regions "C", in which symbols and logos are projected, controls the acoustic volume of the speakers of an audio system, since soft keys "B" are activated.

FIG. 3B shows symbols concerning the functionalities of controlling a system such as interior temperature or air conditioning system. In this embodiment, the projector 8 projects a "+" symbol, on the left, and a "−" symbol, on the right. In this figure, two regions "C" are clearly shown in which the contact surface 42 does not emit light among the remainder portions of the contact surface 42, from which light is emitted. In this embodiment, a user touching on the regions "C", in which symbols are projected, controls the interior temperature or air conditioning system, since soft keys "B" are activated.

FIG. 3C, instead, shows a logo concerning activating or deactivating the air conditioning system. In this embodiment, the projector 8 projects a logo concerning the air conditioning system, namely a snowflake symbol. In this figure, a region "C" is clearly shown in which the contact surface 42 does not emit light among the remainders portions of the contact surface 42, from which light is emitted. In this embodiment, a user touching on the region "C", in which a logo is projected, is able to activate or deactivate the air conditioning system, since a soft key "B" is activated.

At last, FIG. 3D shows a logo concerning activating or deactivating the ceiling lights. In this embodiment, the projector 8 projects a logo concerning the ceiling lights, namely an emitting light ceiling bulb symbol. In this figure, a region "C" is clearly shown in which the contact surface 42 does not emit light among the remainders portions of the contact surface 42 from which light is emitted. In this embodiment, a user touching on the region "C", in which a logo is projected, is able to activate or deactivate the ceiling lights, since a soft key "B" is activated. In a possible embodiment of the ambient lighting system 3 of the present disclosure, the ambient lighting system 3 includes a feedback system 9.

The feedback system 9 may provide at least one feedback to the user of the activation of a soft key "B", to each touch of the soft key "B" detected by the at least one touch sensor 6, and/or of each functionality activated, according to the commands recognized by the voice command recognition system 7.

The feedback can be a haptic feedback and/or an audible feedback. Therefore, the feedback system 9 could comprise an actuator able to produce a vibration perceptible by the user's body portion, giving a haptic feedback, when it is touching the contact surface 42, for instance though the same contact surface 42, and/or an actuator able to produce sounds perceptible by the user, giving an audible feedback.

The feedback system 9 may be electronically connected to the control unit 32. For example, the control unit 32 may drive the feedback system 9.

The ambient lighting system 3 of the present disclosure is particularly suitable for being applied in automobiles 2. The automobile 2 comprises a passenger compartment 22, wherein inner equipment is located. The passenger compartment 22 includes at least one area configured to be lit by means of an ambient lighting system 3 according to the present disclosure.

In an embodiment, the ambient lighting system 3 according to the present disclosure is located adjacent to at least a portion of a central console in the passenger compartment 22. For instance, the ambient lighting system 3 can be placed at the corners, or along the border or edges, of a central console comprised in the passenger compartment 22. Alternatively, the ambient lighting system 3 can be placed on doors, which allow the users to enter in the passenger compartment 22, or around the rearview mirror, or around the car ceiling console, or even any other suitable place.

In the embodiment in which the ambient lighting system 3 is placed adjacent to at least a portion of the central console, the at least one projector 8 could be located on the ceiling of the passenger compartment 22.

Figure 5:
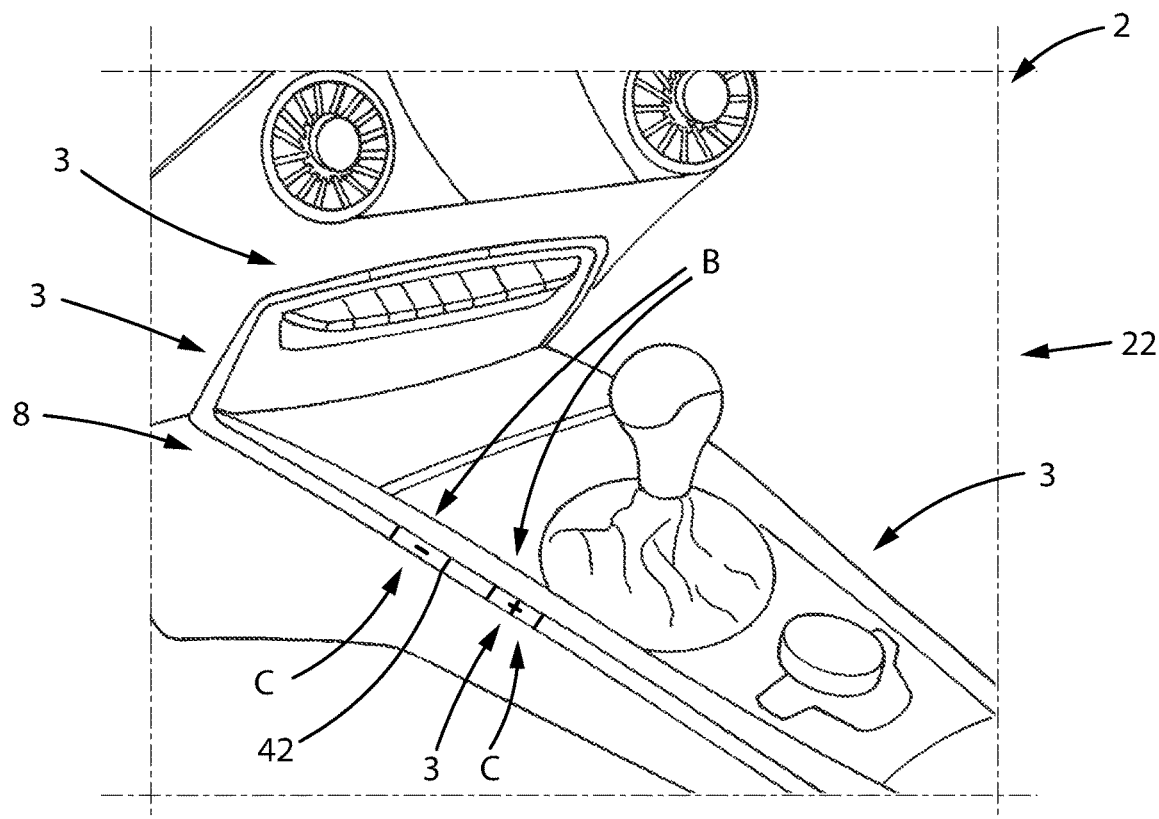
FIG. 5 shows a portion of an automobile, in particular a passenger compartment, in which an ambient lighting system according to the present disclosure is comprised.

FIG. 5 shows a portion of a passenger compartment 22 of an automobile 2, in which at least one area is configured to be lit by means of an ambient lighting system 3, according to the present disclosure. In particular, FIG. 5 shows a central console of the passenger compartment 22, comprising the shift knob, a plurality of keys, which are specifically designed in order to activate a relative specific function or functionality.

At the console's border or edge is placed at least a portion of the ambient lighting system 3. A user, for instance the driver, can immediately see the logos and/or symbols, located in at least a region "C" that defines the area on which the user can touch the contact surface 42 in order to control the functionality corresponding to the logos and/or symbols projected on the contact surface 42.

The logos and/or symbols are projected on the contact surface 42 though a projector 8. In correspondence of the one or more region "C" one or more soft keys are activated in order to receive input by the user touching on the region "C".

In an embodiment, the one or more regions "C" are deactivated in such a way that the symbols and/or logos are clearer and better visible compared to the remainder contact surface 42, which continues to emit light according to the desired of the users.

In the embodiment shown in FIG. 5, two region "C" are shown, on which two different symbols are projected, namely a "+" symbol and a "−" symbol and a corresponding soft key "B" is activated.

FIG. 1A shows a portion of the ambient lighting system 3 of the present disclosure operable as an interactive human-machine interface. FIG. 1A shows in a section view a portion of an embodiment of the ambient lighting system 3 of the present disclosure able to show logos and/or symbols on a contact surface 42 of the ambient lighting system 3. In this embodiment, first light guide modules 43 grouped between second light guide modules 44 are shown. The first light guide module 43 are designed in order to show the regions "C", more preferably showing clearly the edges of each region "C".

Each light guide module (43, 44) is associated to a single light source 41, in which the light sources 41 are placed on a supporting structure 40. Above the light guide modules (43, 44) a diffusive module 422 in lain down, on the diffusive module 422 is placed the contact surface 42. Locally interposed between the diffusive module 422 and the contact surface 42 one or more conductive layers 63, configured to define the soft key "B", are placed.

The ambient lighting system 3 of the present disclosure comprises a projector 8, which is schematically shown in FIG. 1A, in order to explain that the projector 8 is able to project symbols and/or logos on the at least one contact surface 42.

Figure 1B:
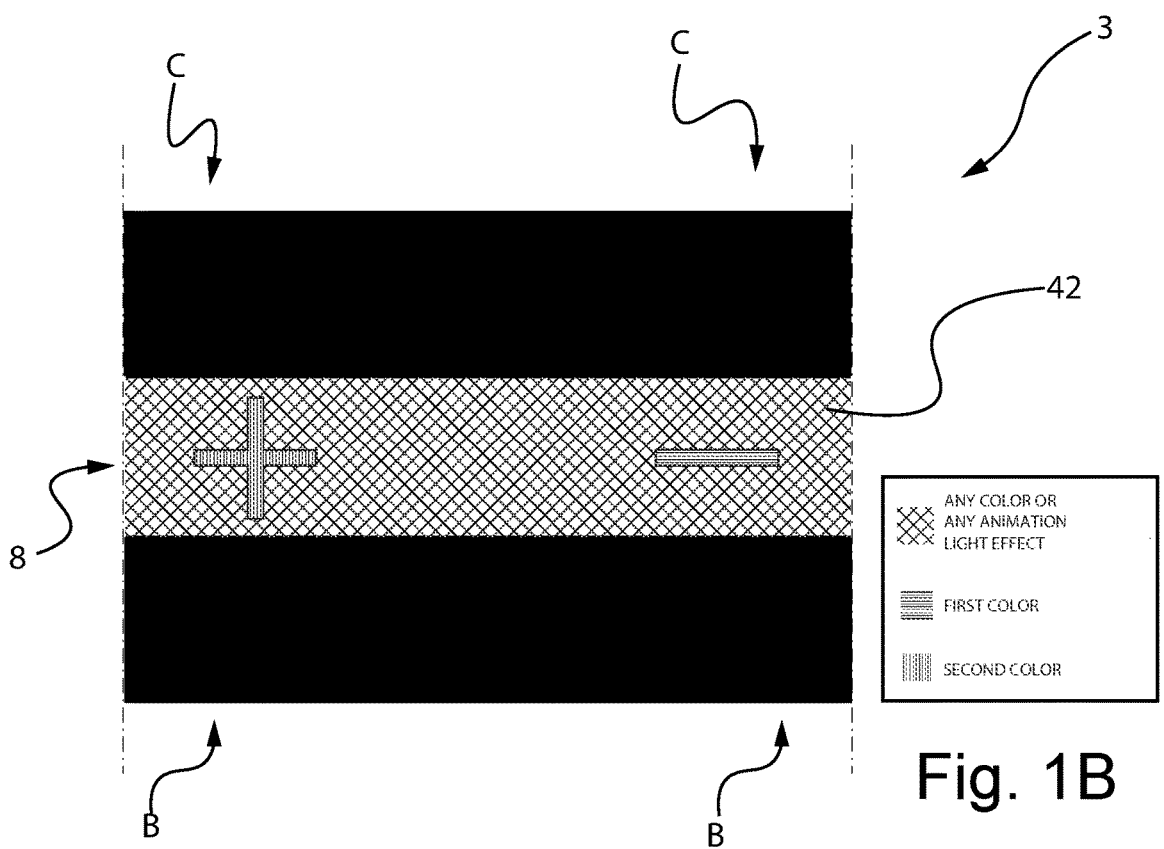

FIG. 1B shows a portion of the ambient lighting system 3 according to the present disclosure. More in particular, FIG. 1B shows, from a top view, a portion of the ambient lighting system 3 in which logos and/or symbols are projected on the contact surface in a first possible embodiment. In this embodiment, a "+" symbol on the right and a "−" symbol on the left are projected on the contact surface 42, thanks to the projector 8. The projector 8 is designed to project symbols or logos in two defined region "C" in each of which a corresponding soft key "B" is activated. In this embodiment, the projector 8 is designed in such a way to be able to project the "−" symbol in a first color which is clearly visible over the contact surface 42 although the contact surface 42 emits light in any color or any animation lighting effect. In the same way the projector 8 is designed in such a way to be able to project the "+" symbol in a second color, different compared to the first color, which is clearly visible over the contact surface 42 although the contact surface 42 emits light. In this embodiment, the first color could be blue and the second color could be red, and the contact surface 42 is lit up in any color, preferably colors allowing clearly seeing the "+" and "−" symbols.

The ambient lighting system 3, according to the present disclosure can be driven and/or controlled though one or more method. One possible method for driving and/or controlling an ambient lighting system 3, according to the present disclosure, comprises the following steps:

arranging an ambient lighting system 3, according to the present disclosure, in a passenger compartment 22 of an automobile 2;
activating the ambient lighting system 3 to present one or more programmed light animations;
receiving a command recognized thorough a voice command recognition system 7 of at least one person previously recorded and identified;
activating at least one soft key "B", concerning the command recognized by the voice command recognition system 7 in correspondence of at least one region "C" and projecting at least one symbol and/or logo, concerning the command recognized by the voice command recognition system 7, on a contact surface 42 of the ambient lighting system 3 by means of at least one projector 8, in correspondence of at least one region "C" where at least one soft key "B" has been activated, while the ambient lighting system 3 is presenting the one or more programmed light animations;
receiving signals from at least one soft key "B" associated to the at least one region "C" as a consequence of their interaction with the user;
deactivating the at least one soft key "B" and interrupting projecting the at least one symbol and/or logo on the contact surface 42.

The steps of the method may be executed as a sequence, in the sequence as shown provided. However, one or more of the steps may be performed in a different order.

This method allows rendering the ambient lighting system a complex human machine interface, which give specific visual feedbacks only when properly activated.

The method for driving and/or controlling the ambient lighting system 3 may include the step of activating at least one soft key (B), also including the following sub-steps:

deactivating, by means of a control unit 32, one or more light sources 41 in correspondence to at least one region "C" where at least one soft key "B" has been activated; and
projecting at least one symbol and/or logo, concerning the command recognized, on the contact surface 42 of the ambient lighting system 3 by means of at least one projector 8, in correspondence of at least one region (C) where one or more light sources 41 have been deactivated.

FIGS. 2A-2D show, in a sequence of pictures, a portion of the ambient lighting system 3 of the present disclosure in which are shown steps of the method for driving and/or controlling the ambient lighting system 3, according to the present disclosure.

In particular the figures show changings during time in the ambient lighting system 3. More in particular the figures show what a user can see, looking at the ambient lighting system during the sequence of steps from the activation phase to the deactivation step of the ambient lighting system 3 according to the present disclosure.

In particular, FIG. 2A shows, from a top view, a portion of the ambient lighting system 3 that emits lights according to a color or an animation desired. The user can see this configuration during the steps of activating the ambient lighting system and/or receiving a command of the method for driving and/or controlling the ambient lighting system 3.

FIG. 2B shows, from a top view, the same portion of the ambient lighting system 3 of FIG. 2A. In this configuration, two blocks or regions "C" are deactivated or changed while the rest of the ambient lighting system is continuing emitting lights according to a color or an animation desired. This configuration could appear, preferably not visible to human eye, while the method is passing from the step of receiving a command and activating at least one soft button "B".

FIG. 2C shows, from a top view, the same portion of the ambient lighting system 3 in which inside the two deactivated or changed blocks or regions "C" two logos or symbols are projected by means of the projector 8. In this embodiment, inside the two regions the logos of the telephone handset, namely for picking up a call on the right and for hanging up the call on the right, are projected. In this figure it is clearly shown that the rest of the ambient lighting system 3 is continuing emitting lights according to a color or an animation as desired. This configuration can be seen by the users during the steps of: activating at least one soft button and/or receiving signals from at least one soft button of the method for driving and/or controlling the ambient lighting system 3.

At last, FIG. 2D shows, from a top view, the same ambient lighting system 3, in which it emits lights according to a color or an animation desired similar to FIG. 2A. In this figure it is clear that the projector 8 stopped projecting the symbols on the contact surface 42 of the ambient lighting system 3. This configuration can be seen by a user during and subsequently the step of deactivating the at least one soft button of the method for driving and/or controlling the ambient lighting system 3.

In a possible embodiment, the ambient lighting system 3 of the present disclosure can be used for controlling temperature inside the compartment 22 of the automobile 2. In this embodiment, when the user says "climate", the voice command recognition system 7 recognizes the command and the control unit 32 controls the plurality of RGB LED light sources 41 of the optical system 4, in order to show to the user the defined region "C". In this embodiment, the defined regions "C" define two soft keys "B", and inside each region "C" a logo and/or symbol is projected by the projector 8. More preferably, the control unit 32 controls at least one RGB LED light sources 41 so that the user sees the regions "C", since they are deactivated over the remainder ambient lighting system 3, which remains activated, thus lit up. At the same time, the control unit 32 controls the projector 8 in order to project a symbol "−" in one region "C" and a symbol "+" in the other region "C", and controlling the touch sensor 6 in order to detect touches of the contact surface 42 by a user's body portion in the defined regions "C".

The symbols projected by the projector 8 are clearly visible on the contact surface 42, therefore the user clearly achieves a visual feedback.

More preferably touching on the soft key "B" having the symbol "−", the temperature inside the compartment 22 decreases, instead, touching on the soft key "B" having the symbol "+" the temperature inside the compartment increase.

In an embodiment, when the command is received by the voice command recognition system 7 and/or at any touch detected by the touch sensor 6, the control unit 32 drives the feedback system 9 in order to give a further feedback, preferably an haptic feedback or an audible feedback, to the user.

More in general, the ambient lighting system 3 of the present disclosure allows some regions "C" in a human-machine interface to provide a further visual feedback to the user, while minimizing additional costs.

The ambient lighting system 3 of the present disclosure allows creating a new human-machine interface (HMI) in an innovative way. The ambient lighting system 3 of the present disclosure allows turning areas of the same ambient lighting system 3 in an input device, which provides further feedback to users, in particular specific visual feedbacks of the commands given.

The ambient lighting system 3, according to the present disclosure is able to make continuous light animation and/or to be illuminated, although in specific regions "C", with could have very sharp contrast to the rest of the ambient lighting system 3, the user can provide inputs for controlling one or more functionalities, thereby achieving a specific visual feedback on the functionality for which users can provide inputs. The user knows intuitively which region or portion of the same ambient lighting system 3 to be touched in order to give inputs and which functionality is to be controlled; therefore, the ambient lighting system 3 is turned into a functional part and it can actively interact with the users.

Any other embodiment not explicitly described and/or illustrated in the present patent application, which will seem obvious to a person skilled in the art in the light of the contents of the present patent application, e.g. obtainable by combining different embodiments of the ambient lighting system described and/or illustrated herein, shall be considered to fall within the protection scope of the present disclosure.

NUMERICAL REFERENCES

Automobile 2
Passenger compartment 22
Ambient lighting system 3
Control unit 32
Memory unit 33
Optical system 4
Structural support 40
Light source 41
Contact surface 42
Diffusive module 422
First Light guide module 43
Inlet surface 432
Parabolic reflecting surface 434
Pipe optics 435
Extractor assembly 436
Extracting prisms 437
Emission surface 438
Second light guide module 44
Touch sensor 6
Conductive layer 63
Voice command recognition system 7
Projector 8
Feedback system 9
Soft key "B"
Region "C"

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An ambient lighting system for automobiles configured to illuminate at least a portion of a passenger compartment, comprising:
   at least one optical system including:
      a plurality of RGB LED light sources configured to emit light rays;
      a structural support on which the plurality of RGB LED light sources are located; and
      at least one contact surface on which a user can interact, and through which the light rays emitted by the plurality of RGB LED light sources can exit;
   the ambient lighting system further comprising:
      a control unit configured to control the plurality of RGB LED light sources of the at least one optical system;

at least one touch sensor in communication with the control unit and configured to detect a touch of the contact surface by a body portion of a user in at least one region defining at least one soft key;

at least one projector in communication with the control unit and configured to project an image on the at least one contact surface;

wherein the control unit is configured to activate the at least one soft key in response to a user command; and wherein the control unit is configured to activate the at least one projector to cause an image concerning the user command to be projected on the contact surface at a location corresponding to the at least one soft key.

2. The ambient lighting system according to claim 1, further comprising a voice command recognizer in communication with the control unit and configured to recognize a voice command, and wherein the user command includes the voice command.

3. The ambient lighting system according to claim 1, wherein the image includes at least one symbol.

4. The ambient lighting system according to claim 1, wherein:
the at least one contact surface includes at least one of: an optical filter, a diffusive module, a light guide module, and a protection layer disposed upon another optical element or module; and
the at least one touch sensor includes a capacitive touch sensor locally integrated in the ambient lighting system.

5. The ambient lighting system according to claim 1, wherein:
the at least one optical system further comprises a plurality of light guide modules interposed between the light sources and the at least one contact surface;
the light guide modules are aligned with each other along a longitudinal extension of the at least one optical system and are configured to guide the light rays emitted by the light sources; and
the plurality of light guide modules includes at least one subgroup configured to isolate the light rays emitted therefrom in order to define the at least one region with contrast against adjacent light guide modules of the optical system.

6. The ambient lighting system according to claim 5, wherein the control unit is configured to deactivate at least one of the RGB LED light sources associated with the at least one region in response to the at least one soft key being activated.

7. The ambient lighting system according to claim 1, wherein the at least one touch sensor includes an optical touch sensor integrated in the projector.

8. The ambient lighting system according to claim 5, wherein the at least one subgroup of the plurality of light guide modules includes one or more first light guide modules; and
wherein each of the one or more first light guide modules comprises:
a planer inlet surface, from which the light rays emitted by a light source enter;
a parabolic reflecting surface configured to collimate, in a controlled manner, the light rays emitted by the light source and entering from the inlet surface; wherein the light source is positioned at a focus of the parabolic reflecting surface;
an extractor assembly, comprising a plurality of extracting prisms, configured to deflect the light rays reflected by the parabolic reflecting surface;
an emission surface, from which the light rays deflected by the extractor assembly are emitted; and
wherein each of the one or more first light guide modules is configured to cause the light rays coming out of the emission surface to be substantially perpendicular to the emission surface.

9. The ambient lighting system according to claim 1, wherein the user command concerns one or more functionalities associated with the at least one soft key; and
wherein the image projected by the projector on the at least one region varies in at least one of color, shape, and size, as a function of the user command concerning the one or more functionalities associated with the at least one soft key.

10. The ambient lighting system according to claim 1, wherein the at least one projector is located inside the passenger compartment of the automobile and spaced apart from the optical system.

11. The ambient lighting system according to claim 8, wherein the one or more functionalities associated with the at least one soft key include a control command for at least one of: a passenger compartment temperature regulation system; an air conditioning system; a telephone audio system; an audio music reproduction system; a seat adjustment system; and a passenger compartment lighting system.

12. The ambient lighting system according to claim 1, further including a feedback generator configured to provide a feedback to the user regarding the activation of a soft key and of each touch of the soft key detected by the at least one touch sensor.

13. An automobile comprising a passenger compartment having at least one area configured to be lit by the ambient lighting system according to claim 1.

14. The automobile according to claim 13, wherein the ambient lighting system is located adjacent to at least a portion of a central console in the passenger compartment; and
wherein the at least one projector is located on a ceiling of the passenger compartment.

15. A method for controlling an ambient lighting system in a passenger compartment of an automobile, comprising:
activating a plurality of LED light sources to present a light animation on a contact surface;
receiving a user command;
activating, in response to the user command, at least one soft key concerning the user command and corresponding to at least one region;
projecting, using at least one projector, and in response to the user command, at least one image concerning the user command on the contact surface of the ambient lighting system and in a location corresponding to at least one region where at least one soft key has been activated, while the plurality of LED light sources are presenting the light animation;
receiving signals from the at least one soft key associated to the at least one region as a consequence of a user interaction with the at least one soft key; and
deactivating the at least one soft key and interrupting projecting the image on the contact surface.

16. The method according to claim 15, further comprising recognizing, by a voice command recognizer, a voice command from a user, and wherein the user command includes the voice command.

17. The method according to claim 15, wherein the image includes at least one symbol.

18. The method according to claim 15, wherein activating the at least one soft key further comprises:

deactivating, by a control unit, one or more light sources corresponding to at least one region where at least one soft key has been activated; and projecting, by at least one projector, an image concerning the user command, on the contact surface of the ambient lighting system and at a location corresponding to at least one region where one or more light sources are deactivated.

\* \* \* \* \*